(12) United States Patent
Hsieh

(10) Patent No.: US 8,808,558 B2
(45) Date of Patent: Aug. 19, 2014

(54) SYSTEM AND METHOD FOR ALIGNMENT OF NANOPARTICLES ON SUBSTRATE

(75) Inventor: Shu-Chen Hsieh, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 456 days.

(21) Appl. No.: 13/017,326

(22) Filed: Jan. 31, 2011

(65) Prior Publication Data
US 2011/0186543 A1 Aug. 4, 2011

(30) Foreign Application Priority Data

Feb. 4, 2010 (TW) ............................... 99103278 A
Feb. 4, 2010 (TW) ............................... 99103279 A

(51) Int. Cl.
| | | |
|---|---|---|
| B44C 1/22 | (2006.01) | |
| B05D 3/06 | (2006.01) | |
| B32B 5/16 | (2006.01) | |
| B05D 5/00 | (2006.01) | |
| B05D 3/10 | (2006.01) | |

(52) U.S. Cl.
CPC ... *B05D 3/06* (2013.01); *B32B 5/16* (2013.01); *B05D 5/00* (2013.01); *B05D 3/10* (2013.01)
USPC ............... 216/58; 216/66; 216/67; 427/282

(58) Field of Classification Search
None
See application file for complete search history.

(56) References Cited

U.S. PATENT DOCUMENTS

| | | | |
|---|---|---|---|
| 6,303,516 B1 * | 10/2001 | Morita et al. | 438/758 |
| 2004/0110347 A1 * | 6/2004 | Yamashita | 438/286 |
| 2006/0070494 A1 * | 4/2006 | Yoshii et al. | 75/365 |

OTHER PUBLICATIONS

Mesquida et al, Patterning Amyloid Peptide Fibrils by AFM Charge Writing, Sep. 29, 2006, American Chemical Society, Langmuir, Fo. 22, No. 22, 2006, p. 9089-9091.*

* cited by examiner

*Primary Examiner* — Binh X Tran
*Assistant Examiner* — David Cathey, Jr.
(74) *Attorney, Agent, or Firm* — Muncy, Geissler, Olds & Lowe, P.C.

(57) ABSTRACT

The invention provides a system and method for alignment of nanoparticles on a substrate. The system includes: a substrate; a plurality of polypeptide templates formed on the substrate; and a plurality of nanoparticles formed on the polypeptide templates. The method includes: providing a substrate; forming a plurality of polypeptide templates on the substrate; and forming a plurality of nanoparticles on the polypeptide templates.

3 Claims, 4 Drawing Sheets

SYSTEM AND METHOD FOR ALIGNMENT OF NANOPARTICLES ON SUBSTRATE

CROSS REFERENCE TO RELATED APPLICATIONS

This Application claims priority of Taiwan Patent Application No. 099103278, filed on Feb. 4, 2010, and Taiwan Patent Application No. 099103279, filed on Feb. 4, 2010 the entirety of which is incorporated by reference herein.

BACKGROUND OF THE INVENTION

1. Field of the Invention

The present invention relates to a system and method for alignment of nanoparticles on a substrate, and in particular relates to a system and method for alignment of nanoparticles on a substrate by a polypeptide template.

2. Description of the Related Art

Nanoparticles (NPs) are widely used in optical-electrical devices, such as a plasmon waveguide, due to the unique optical, chemical, electronic and magnetic properties thereof. The plasmons in the visible regime have very limited propagation distance (on the order of tens of microns), and thus the propagation distance depends on the uniformity and alignment of the NPs. Up to now, the uniformity of the NPs is well controlled by current technology. However, alignment of nanoparticles is still a challenge.

Each of the NPs is arranged separately at a specific location by a scanning probe once. However, this method is time-consuming and needs expensive equipment. Some research using DNA as a template to align NPs has been disclosed. Because the DNA itself has negative charges and the substrate also has negative charges, there is a need to modify the substrate with some compounds, such as divalent ions ($Ni^{2+}$ or $Zn^{2+}$), before depositing the DNA templates on the substrate. However, the modification is tedious and the compounds modified on the substrate may reduce the propagation distance of the plasmon.

Accordingly, there is a need to develop a simple and cheap system and method for alignment of the NPs.

BRIEF SUMMARY OF THE INVENTION

The invention provides a system for alignment of nanoparticles on a substrate, comprising: a substrate; a plurality of polypeptide templates formed on the substrate; and a plurality of nanoparticles formed on the polypeptide templates.

The invention also provides a method for alignment of nanoparticles on a substrate, comprising: providing a substrate; forming a plurality of polypeptide templates on the substrate; and forming a plurality of nanoparticles on the polypeptide templates.

A detailed description is given in the following embodiments with reference to the accompanying drawings.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
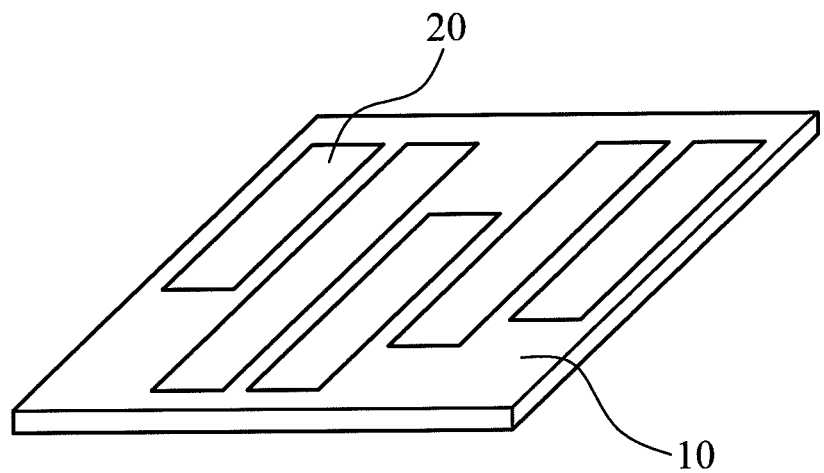
FIGS. 1 to 2 show the method for alignment of the NPs on a substrate in accordance with the invention.
Figure 2:
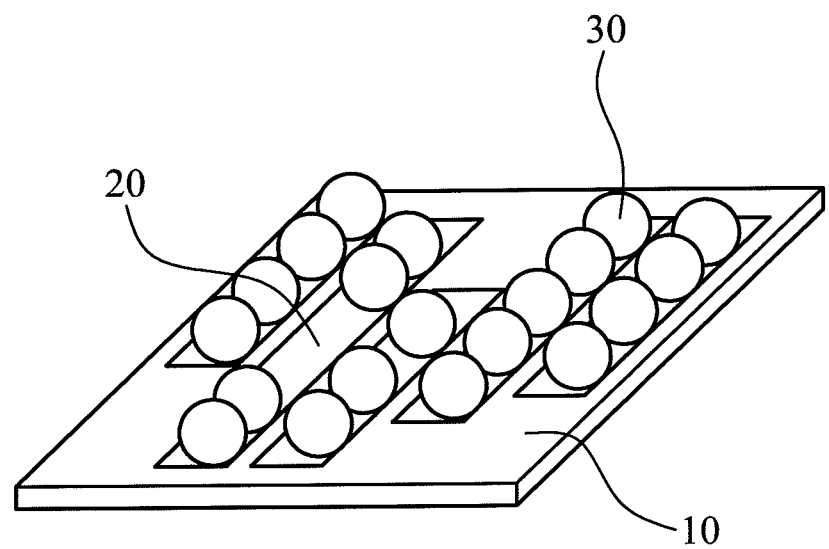

The invention provides a system and a method for alignment of the nanoparticles on a substrate. FIG. 1-2 shows the fabricating method for alignment of the nanoparticles on the substrate. Referring to FIG. 1, a substrate 10 is firstly provided, and a plurality of polypeptide templates 20 is formed on the substrate 10.

The substrate 10 comprises a transparent substrate or non-transparent substrate. The transparent substrate comprises glass, Si substrate, quartz substrate, indium tin oxide (ITO) or combinations thereof. The non-transparent substrate comprises graphite, mica, ceramic substrate or combinations thereof. Note that the nanoparticles are applied to an optical-electrical device, and the transparent substrate, such as a glass substrate, is preferred to be used as the substrate of the optical-electrical device.

The substrate 10 comprises a flexible substrate, such as polydimethylsiloxane (PDMS), polyethylene terephthalate (PET), polyethylenenaphthalate (PEN), polycarbonate (PC), polyethersulfone (PES) or polyimide (PI). Note that the nanoparticles are applied to a flexible optical-electrical device, and the flexible substrate, such as polyethylene terephthalate (PET) substrate, is preferred to be used as the substrate of the flexible optical-electrical device.

The polypeptide templates 20 comprise amyloid fibril, and the amyloid fibril comprises insulin amyloid fibril, serum amyloid A, amyloid-beta, heparin sulphate proteoglycans, complement protein, transthyretin protein, apolipoprotein E, C-reactive protein (CPR) or antitrypsin (AAT).

Additionally, before forming the polypeptide templates 20 on the substrate 10, a clean step is conducted. For example, using a plasma treatment, a UV-ozone process or acid washing to remove the unwanted organic materials on the substrate 10.

In one embodiment, a liquid containing the amyloid fibril is directly dipped on the substrate 10 to form the polypeptide templates 20. In another embodiment, the substrate 10 is directly immersed in a liquid containing the amyloid fibril to form the polypeptide templates 20. However, the formation of the polypeptide templates 20 is not limited to the above-mentioned methods, and other formation methods (such as a coating method) are also included in the scope of the invention.

Because the polypeptide templates 20 have amine groups ($NH_2$) which are chargeable, the polypeptide templates 20 are absorbed on the substrate 10 by the electrostatic attraction therebetween. In prior art, DNA is used as a template for alignment of nanoparticles, and the substrate is needed to be first modified before depositing the DNA. Compared with the prior art, the polypeptide 20 is directly formed on the substrate 10 without any tedious modification process.

Additionally, the polypeptide templates 20 have nitrogen atoms, oxygen atoms and the peptide bonds (—CO—NH—), thus, there are many hydrogen bonds between the polypeptide templates 20. Compared with the prior art, the structure of the polypeptide templates 20 is more rigid than the double strand DNA, thus, deposition direction of the polypeptide templates 20 is easier to control than that of DNA.

In one preferred embodiment, a commercial insulin amyloid is put into an acid solution to form a mixture and the mixture is placed in an oven at 80-100° C. for 2-4 hours to grow fibril-like structures. Then, the insulin amyloid fibril is formed on the Si substrate by directly drop-cast onto the substrate. In general, insulin amyloid fibril has a diameter of about 2 nm-5 nm and a length of about 5 nm-50 μm. The length of the insulin amyloid fibril will increase if the preparation time increases.

Note that those skilled in the art may adjust the pH value, temperature, and time for preparation of the insulin amyloid fibril according to actual application needs to obtain insulin amyloid fibrils with different diameters and lengths.

Then, referring to FIG. 2, a plurality of the nanoparticles is formed on the polypeptide templates 20. Because the nanoparticles 30 have negative charges and the polypeptide templates 20 have positive charges ($NH_2$ group), the nanoparticles 30 are aligned along the deposition direction of the polypeptide templates 20 by the electrostatic interaction therebetween.

The nanoparticles 30 comprise gold, silver, semiconductor nanoparticles or combinations thereof, wherein the semiconductor nanoparticles comprise ZnSeHg, CdS, PbS, ZnS, CdSe, ZnSe, CdTe or ZnTe. The nanoparticles have a diameter of about 1 nm-500 nm, and preferably 3 nm-40 nm, and more preferably 2 nm-30 nm.

The diameter of the nanoparticles 30 is close to the diameter of the polypeptide templates 20, thus, there is a strong interaction between the nanoparticles 30 and the polypeptide templates 20. In one embodiment, the insulin amyloid fibril has a diameter of about 2 nm-5 nm, and the gold nanoparticles has a diameter of about 2 nm-5 nm, and there is a strong interaction therebetween.

Figure 3:
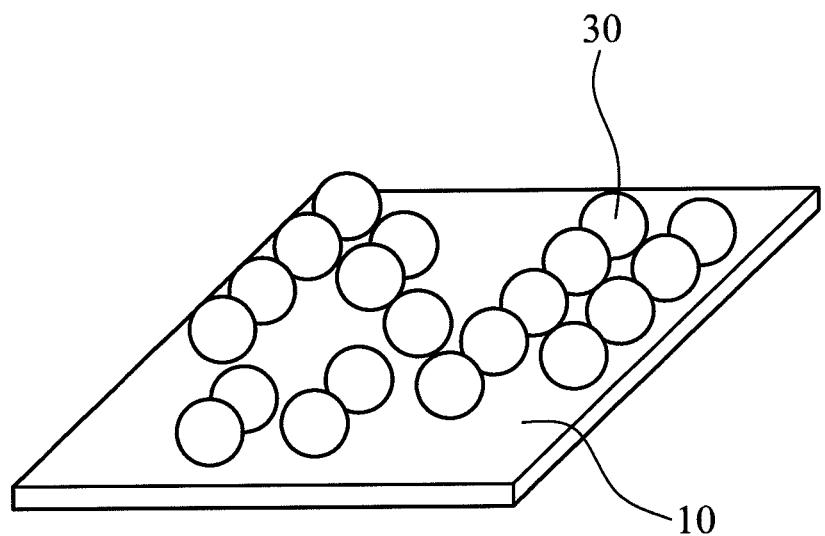
FIG. 3 shows a cross-sectional schematic representation of a removal process in accordance with the invention.

Additionally, as shown in FIG. 3, after forming the nanoparticles 30 on the substrate 10, a removal process is conducted to remove the polypeptide templates 20. The removal process is to remove the unwanted organic compounds of the polypeptide templates 20, and it comprises a plasma process or a UV-ozone process. However, the removal process is not limited to the above-mentioned process, and other removal processes that do not destroy the structure of the nanoparticles 30 are also included in the scope of the invention.

FIG. 2 also shows the system for alignment of nanoparticles on the substrate, wherein the polypeptide is used as a template to help the arrangement of the nanoparticles. As shown in FIG. 2, the system comprises a substrate 10, a plurality of polypeptide templates 20 formed on the substrate 10 and a plurality of nanoparticles 30 formed on the polypeptide templates 20. The materials of the substrate 10 and the polypeptide templates 20 are as previously described, thus, they are omitted here.

In order to identify if the nanoparticles are aligned on the substrate 10, the substrate 10 is scanned by a dark field microscopy (Carl Zeiss, Axio Observer A1m). In one embodiment, the dark field microscopy was used to image the samples following insulin fibril deposition and Au nanoparticles attachment. Due to the strongly enhanced localized surface plasmon resonance (LSPR), Au nanoparticles enhanced scattered light travel in a length of about 20 μm. Therefore, the alignment of the nanoparticles provided by the invention is very promising for usage in optical-electronic devices.

Additionally, a three-dimensional Atomic Force Microscopy (AFM) (MFP-3D from Asylum Research, Santa Barbara, USA) is used to image the morphology of the substrate with the nanoparticles. In one embodiment, the Au nanoparticles are orderly arranged on the substrate, and the spacing between the nanoparticles is the diameter of a single nanoparticle. In another embodiment, the spacing between the nanoparticles is about 10 nm which is the diameter of a single nanoparticle. According to reseatch (*Adv. Mater.* 2001, 13, 19, 1501-1505), the better spacing between the nanoparticles for propagation of plasmon is the diameter of a single nanoparticle. Thus, if the system and method of the invention are applied to the plasmonic waveguides, the plasmons will be propagated effectively.

The transmission efficiency of the plasmon will be effected by any media which interacts with the nanoparticles. Therefore, the polypeptide templates are preferably removed when the nanoparticles are applied to optical-electronic devices (such as a plasmonic waveguides). Note that the polypeptide templates of the invention are removed by a simple removal process (such as a plasma removal process), and the removal process is simple and cheap and does not effect the original arrangements of the nanoparticles.

The Fourier transform infrared spectroscopy (FTIR) is used to analyze the substrate 10 before and after the removal process, and the results show that the polypeptide templates 20 are indeed removed.

Four main advantages of the system and method for alignment of nanoparticles on the substrate are as follows:

(1) The polypeptide templates are directly formed on the substrate without any tedious modification processes for the substrate.

(2) The deposition direction of the polypeptide templates 20 is easier to control than DNA due to the rigid structure of the polypeptide templates 20.

(3) The polypeptide templates 20 are removed by a simple removal process (such as a plasma removal process).

(4) The alignment of the nanoparticles 30 provided by the invention is very promising for usage in optical-electronic devices.

EXAMPLE

Example 1

Au Nanoparticles Formed on an Si Wafer 0.001 g of powder of insulin amyloid (product name: bovine pancreas, purchased from sigma) was place in a vial. 1 ml of HCl (0.025 M) was added into the vial and the insulin amyloid and the HCl were mixed well. Then, the mixture was placed in an oven at 80° C. for 2.5 hours to obtain the insulin amyloid fibril.

An Si wafer was used as a substrate and placed into a plasma chamber for 2 minutes to remove the unwanted organic compounds on the Si wafer. 50 μl of the insulin amyloid fibril was dipped on the cleaned wafer and left standing for 30 seconds. The wafer was cleaned by ultrapure water and dried by nitrogen gas, and the insulin amyloid fibril was attached to the wafer.

The wafer with the insulin amyloid fibril was immersed in a solution containing Au nanoparticles (diameter of 10 nm) for 10 minutes. Then, the wafer was taken out, cleaned by the ultrapure water and dried by the nitrogen gas. The nanoparticles were attached on the location of the insulin amyloid fibril.

Example 2

The Morphology of the Substrate

The experimental condition of the Example 2 was the same as that of the Example 1, except that the diameter of the Au nanoparticles was about 300 nm-500 nm. Attachment 1 shows a dark field microscopy image of the Example 2. As shown in Attachment 1, due to the strongly enhanced localized surface plasmon resonance (LSPR), Au nanoparticles enhanced scattered light travel in a length of about 20 µm. Therefore, the alignment of the nanoparticles provided by the invention is very promising for usage in optical-electronic devices.

Example 3

Conducting a Removal Process

The substrate of the Example 1 was placed in a plasma chamber for 2 minutes to conduct a removal process to remove the insulin amyloid fibril.

Figure 4A:
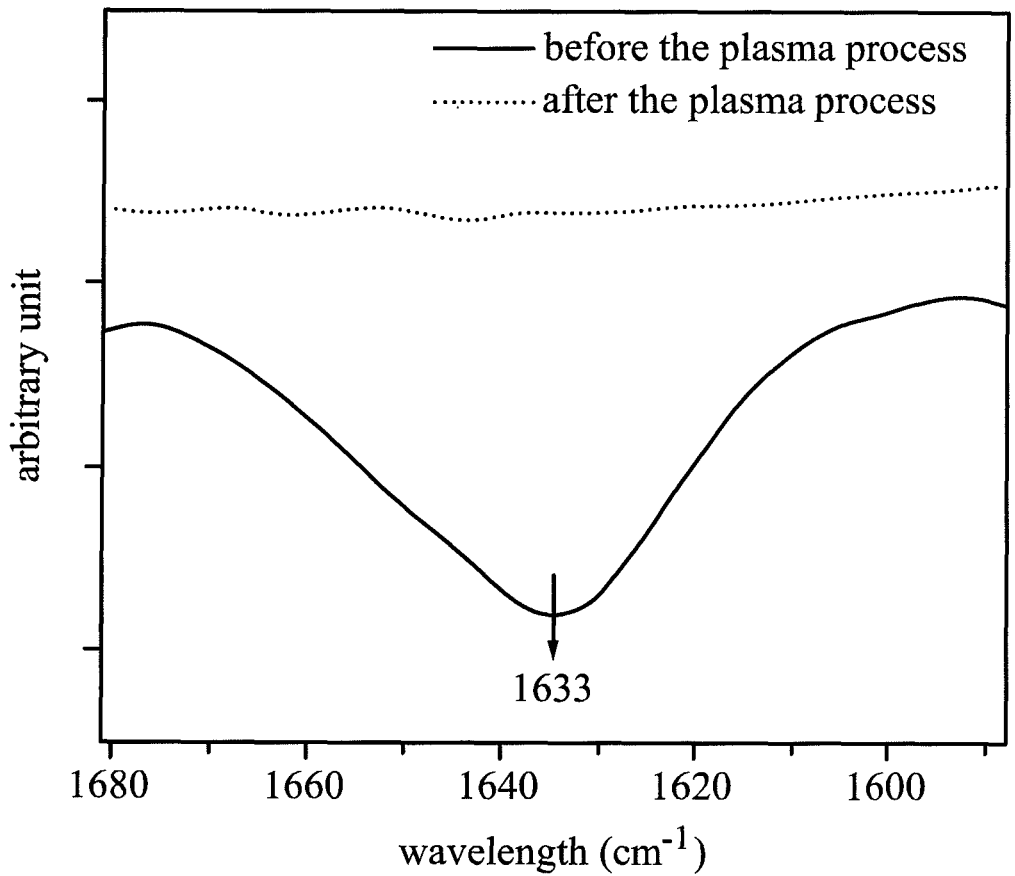
FIGS. 4A and 4B show FTIR images of the Au nanoparticles on a substrate in accordance with the invention.
Figure 4B:
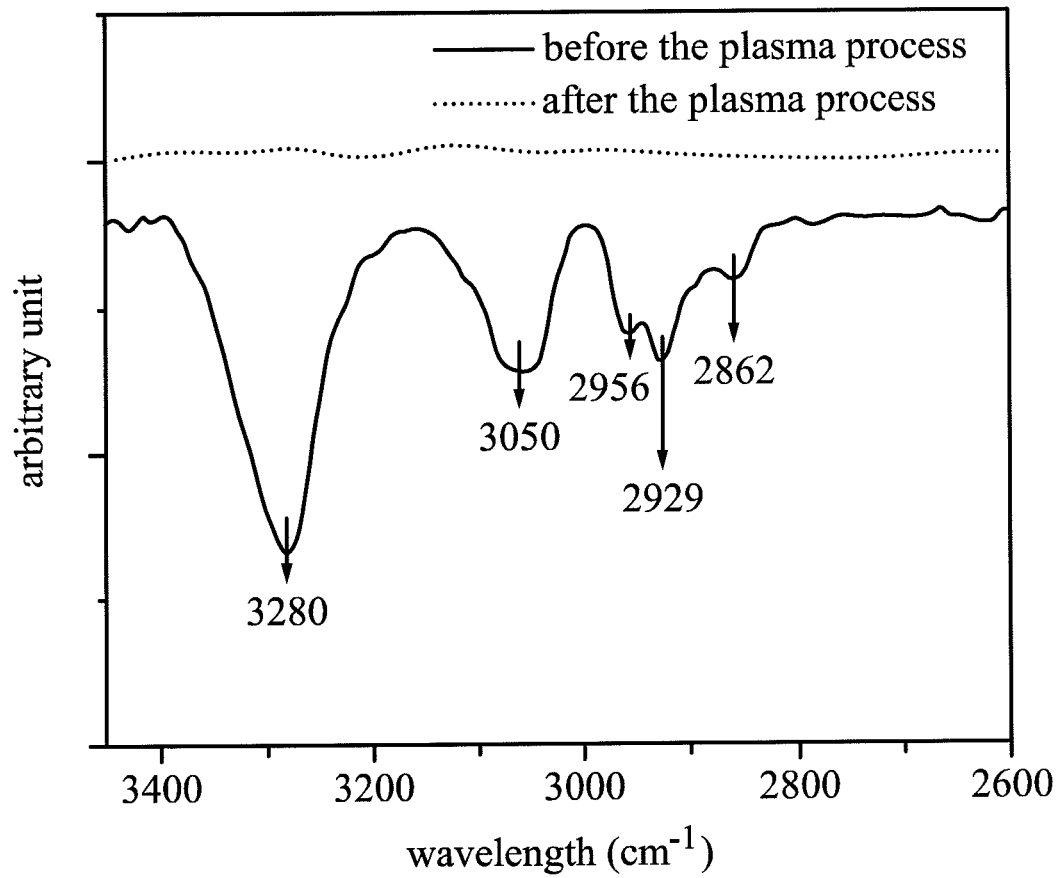

FIGS. 4A and 4B show the FTIR spectra of the substrate before and after the plasma process, wherein the solid line represents the substrate before the plasma process, and the dashed line represents the substrate after the plasma process. As shown in FIGS. 4A and 4B, the wavenumber of 3280, 3050, 2958, 2929, 2862, 1633 $cm^{-1}$ disappeared to indicate that the insulin amyloid fibril was removed by the plasma process.

Attachment 2 shows a 3D AFM image of the substrate after removing the insulin amyloid fibril, wherein the Au nanoparticles were still deposited on the substrate after the removal process.

Example 4

PDMS Substrate

The experimental condition of the Example 4 was the same as that of the Example 1, except that the substrate used was made of polydimethylsiloxane (PDMS). Attachment 3 shows a 3D AFM image of the PDMS substrate following insulin amyloid fibril and Au nanoparticles attachment, wherein the insulin amyloid fibril was aligned on the PDMS substrate, and the Au nanoparticles were attached on the insulin amyloid fibril.

Example 5

ITO Substrate

The experimental condition of the Example 5 was the same as that of the Example 1, except that the substrate used was made of indium tin oxide (ITO). A 3D AFM image of the ITO substrate following insulin amyloid fibril and Au nanoparticles attachment shows that the insulin amyloid fibril was aligned on the ITO substrate, and the Au nanoparticles were attached on the insulin amyloid Example 6

ZnSeHg Nanoparticles

The experimental condition of the Example 6 was the same as that of the Example 1, except that the nanoparticles were ZnSeHg with a diameter of about 3 nm-4 nm. Attachment 4 shows a 3D AFM image of the Si wafer following insulin amyloid fibril and ZnSeHg nanoparticles attachment, wherein the insulin amyloid fibril was aligned on the Si wafer, and the ZnSeHg nanoparticles were attached on the insulin amyloid fibril.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for alignment of nanoparticles on a substrate, comprising:
    providing a substrate, wherein the substrate comprises a transparent substrate or non-transparent substrate, wherein the substrate consists of glass, quartz substrate, indium tin oxide (ITO), graphite, mica, ceramic substrate, polydimethylsiloxane (PDMS), polyethylene terephthalate (PET), polyethylenenaphthalate (PEN), polycarbonate (PC), polyethersulfone (PES) or polyimide (PI);
    forming a plurality of polypeptide templates directly on the substrate without adding a compound to the substrate prior to forming the polypeptide templates directly on the substrate; and
    forming a plurality of nanoparticles on the polypeptide templates.

2. The method for alignment of nanoparticles on a substrate as claimed in claim 1, after forming a plurality of nanoparticles on the polypeptide templates, further comprising:
    conducting a removal process on the substrate with the nanoparticles to remove the polypeptide templates.

3. The method for alignment of nanoparticles on a substrate as claimed in claim 2, wherein the removal process comprises a plasma process or a UV-ozone process.

* * * * *